United States Patent

[11] 3,561,409

| [72] | Inventor | Paul August<br>C. Capellades 1, Barcelona, Spain |
|---|---|---|
| [21] | Appl. No. | 726,995 |
| [22] | Filed | May 6, 1968 |
| [45] | Patented | Feb. 9, 1971 |
| [32] | Priority | May 20, 1967, May 23, 1967, Aug. 18, 1967 |
| [33] | | Germany |
| [31] | | 55762 and 55785—56534 |

[54] AUXILIARY DEVICE FOR CARBURETOR ENGINES FOR PREPARING THE FUEL CONDENSATE
4 Claims, 10 Drawing Figs.

[52] U.S. Cl.................................... 123/97,
    123/119, 123/124
[51] Int. Cl..................................... F02m 23/08,
    F02m 23/02
[50] Field of Search............................. 123/97 (B),
    26, 119 (D), 124, 124 (A), 124 (B)

[56] References Cited
UNITED STATES PATENTS

| 1,240,303 | 9/1917 | Brasier | 123/124 |
| 1,264,221 | 4/1918 | Stransky | 123/124 |
| 1,456,213 | 5/1923 | Bowles | 123/124 |
| 1,503,371 | 7/1924 | Meyer | 123/124 |
| 3,414,242 | 12/1968 | Bouteleux | 123/124 |
| 2,958,315 | 11/1960 | Williams | 123/97B |
| 3,116,725 | 1/1964 | Hadley | 123/97B |
| 3,270,724 | 9/1966 | Dolza | 123/97B |
| 3,310,044 | 3/1967 | Haverstick | 123/97B |

FOREIGN PATENTS

| 495,321 | 11/1938 | Great Britain | 123/124 |
| 841,372 | 7/1952 | Germany | 123/124 |

*Primary Examiner*—Mark M. Newman
*Attorney*—Warren, Rubin, Brucker and Chickering ABSTRACT: An auxiliary air intake for combustion engines which responds to pressure differentials between an air intake conduct of the engine and the atmosphere. The auxiliary air intake admits sufficient air to substantially completely burn hydrocarbons present in the fuel-air mixture in the engine intake conduct and which would otherwise be exhausted into the atmosphere where they form undesirable pollutants.

PATENTED FEB 9 1971 3,561,409

INVENTOR:
PAUL AUGUST

By Warren, Rubin,
Brucker & Chickering
Attorneys

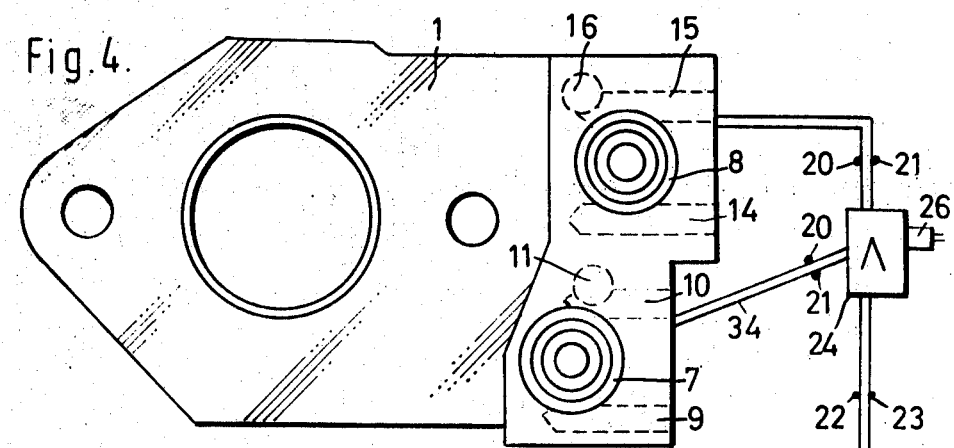
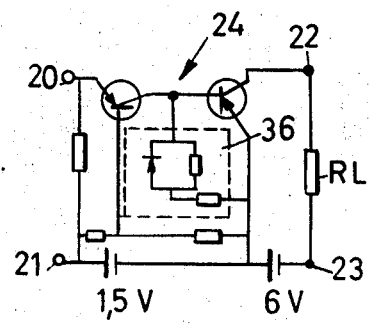
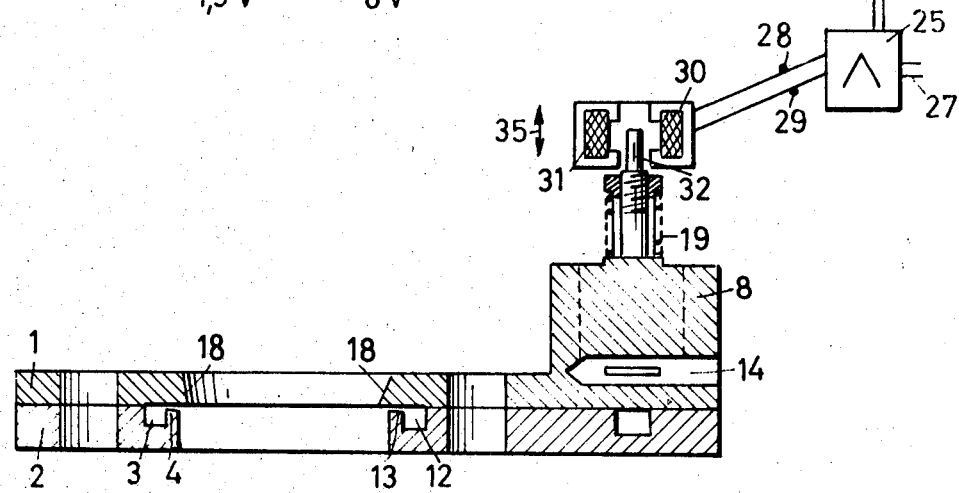

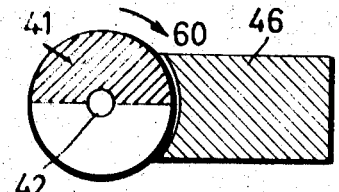
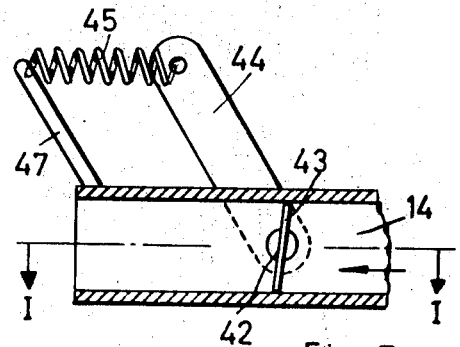
Fig. 6.  Fig. 7.
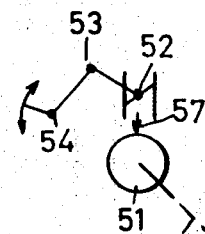
Fig. 8.
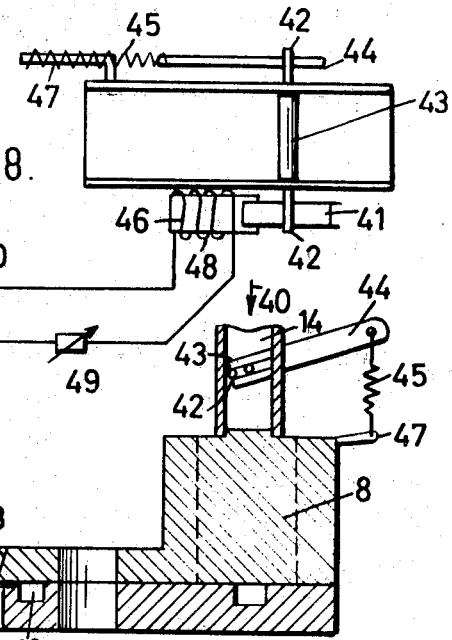
Fig. 9.
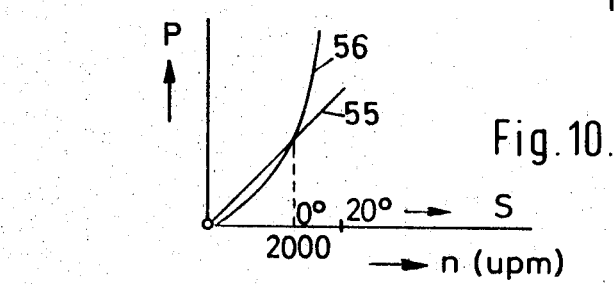
Fig. 10.

AUXILIARY DEVICE FOR CARBURETOR ENGINES FOR PREPARING THE FUEL CONDENSATE

The invention relates to an auxiliary device for carburetor engines for preparing the fuel condensate or mixture in the low-speed/low-load range, as also when accelerating, particularly when idling. Such arrangements have already been suggested. In these, in coasting, when running downhill with the engine acting as a brake, the idling fuel jet is blocked.

It has been found, however, that when the throttle is closed, a considerable amount of fuel dribbles from the main jet at first and flows principally at the bottom of the throttle opening along the carburetor wall and reaches the engine practically without combustion air. Although the idling fuel jet is closed, in the first few seconds there is always an excess development of carbon monoxide and hydrocarbon gases when coasting.

The basic problem of the invention is to improve these devices so that the amount of poisonous gas generated is still further reduced.

To solve this problem in accordance with the invention, a second inlet is provided which, when the pressure deficit increases during coasting, admits combustion air through suitable openings, bores, channels or ports into the engine induction pipe. By this means, the concentration of poisonous gases in the exhaust is further reduced.

In further development of this invention, it is provided that the said second inlet opening is adjustably variable in such a manner as to open opposite the existing first inlet opening only if and when the pressure deficit increases, and close when the engine speed increases. Thus it closes before the first inlet.

It is particularly advantageous to arrange the second inlet in accordance with the invention not on the auxiliary device itself but in connection with the engine induction pipe. Consequently, this arrangement is not linked with the carburetor as is the case with the already-known suggestions.

While all these features of the invention have produced a very satisfactory improvement in the preparation of the mixture in the low-speed/low-load range, another characteristic object of the present invention is to provide the possibility of a further, extensive improvement of the conditions during acceleration and coasting.

It is further particularly advantageous if the air intake can be also mechanically controlled, opening starting substantially when the engine enters the medium and high speed and load ranges. By this means, the effect already mentioned is further increased and ensures that in this case sufficient air is admitted. At a constant speed and running load, a certain negative pressure is present in the induction pipe at a particular throttle setting. When accelerating or climbing a hill, this negative pressure or pressure deficit becomes lower with the same throttle position, and higher when coasting down a hill.

Starting from these known facts, it is suggested as a solution that the fluctuations of the said negative pressure differentials in the engine induction pipe in relation to the running load shall be recorded by a measuring device, and transferred to the motion of the inlet device in such a manner that as the throttle increasingly opens, the inlet device is similarly opened, but that the degree of opening is decreased with a lower pressure deficit than under running load and is increased with a greater pressure deficit than under running load. Consequently, this differential negative pressure is superposed on the existing action of the inlet device whereby a further improvement of the mixture is obtained on acceleration and when coasting.

In further development of the invention, it is suggested that the supplementary air for preparing the condensate shall be admitted to the induction pipe from the side opposite the idling system of the carburetor, or from the side on which the lower part of the closed carburetor throttle lies.

It is particularly advantageous to use an essentially known electric control; compared with mechanical solutions, this has the advantage of an exceptionally rapid reactive response, which is of very great importance in the present case.

In further development of this idea, it is suggested that, when the negative pressure is higher than during idling, i.e., when coasting, the inlet device should be fully open, by which means the circuit can be simplified, in that, in this case, quite simply an air flap or the like is opened fully.

The further development of the invention, besides this, provides that the electric control is influenced by the differential angular opening of the throttle, and engine speed, compared with the running load condition. It is comparatively simple to record the angle of the throttle opening and also the engine speed by known means.

Finally, it can also be provided that the inlet device has an air flap with electromagnets. The air slide opens less with more rapid acceleration, i.e., falling negative pressure, and more when the negative pressure rises. At the same time, parallel with the progressively increasing opening of the throttle, the air flap is increasingly opened.

The electric control thus causes progressively increasing opening of the air slide with progressively increasing opening of the throttle, while fluctuations towards a smaller opening of the air flap with a lower negative pressure than in the running condition and to a wider opening of the air flap with greater negative pressure than under running load are additionally controlled.

For the further simplification of the measuring arrangement and in order to control the auxiliary throttle on the inlet device in such a way that optimum ratios are attained in the unilateral air feed for preparing the condensate (mixture), it is further suggested in accordance with the invention that the inlet device shall be in the form of an auxiliary throttle valve, the actuating shaft of which is rotated in the closing direction by a linearly increasing actuating force, e.g., by a spring 45, and in the opening direction by an actuating force increasing in a ratio less than linear in the lower speed range and more than linear in the high-speed range, e.g. an electromagnet, so that the auxiliary valve opens only when a preset engine speed is attained.

By this means, the force acting on the actuating shaft of the auxiliary throttle is the resultant of two different forces. One force, known as the restoring force, increases linearly with increasing opening of the throttle. The other, opposed force varies nonlinearly as a function of the angular opening of the throttle, or the engine speed respectively. Up to a certain speed range, it is smaller than the restoring force, which varies linearly depending on the opening angle of the throttle. By this means, it is ensured that the throttle which provides the supplementary air opens only when a certain engine speed is attained.

There is a preferential embodiment in which the winding of the electromagnet is charged by the ignition coil, e.g. through an amplifier.

By this means, the engine speed is employed to control this auxiliary throttle. This is actuated by the force differential between the restoring force acting on the throttle and the controlling force. The restoring force is that which moves the throttle into the closed position. The control force is the force which moves the throttle into the open position.

It is an additional advantage if the spring providing the restoring force is so prestressed that the valve opens only from a certain speed onwards (about 2,000 r.p.m.).

It is now possible, depending on the particular kind of engine, to correlate any desired opening stroke with the speed, e.g. by varying the spring constant, by varying the pretensioning of the spring or, e.g. by series resistances in the circuit of the throttle electromagnet. For example, it is possible for the temperature-dependent resistances, i.e. NTC-resistances or PTC-resistances to be connected in the circuit of the electromagnet. By this means, it is now possible to use the engine temperature, as well as the negative pressure, for controlling the opening stroke of the throttle. In the case of a cold engine, opening can be allowed earlier, since in this case the danger of making the mixture too rich is greater than in the case of a fully-hot engine.

A further possibility of using the speed range of the engine for controlling the supplementary air intake consists in arranging that a dynamo or a tachometer (DC generator) charges the winding of the electromagnet through control resistances.

It is possible, for instance, in pretensioning the spring, to make the setting such that the opening motion is started only from a certain speed onwards or, on reverting to this speed, again terminated. On acceleration, the opening of this auxiliary throttle takes place later than that of the pedal-controlled main throttle, since the auxiliary throttle opens only when an appropriate speed is attained, whereas the throttle controlling the mixture feed through the throttle pedal assumes a position independent of the engine speed.

Conversely, when coasting, the sequence for the closing of the throttle is such that although the main throttle is closed abruptly, the auxiliary throttle only closes depending on the engine speed, if the speed has correspondingly decreased. Thus supplementary air is then always supplied and excessive richness of the mixture or the formation of a condensate is avoided.

The invention will now be described in greater detail with reference to the accompanying drawings showing two random exemplary embodiments, partially in diagrammatic form.

Figure 1:
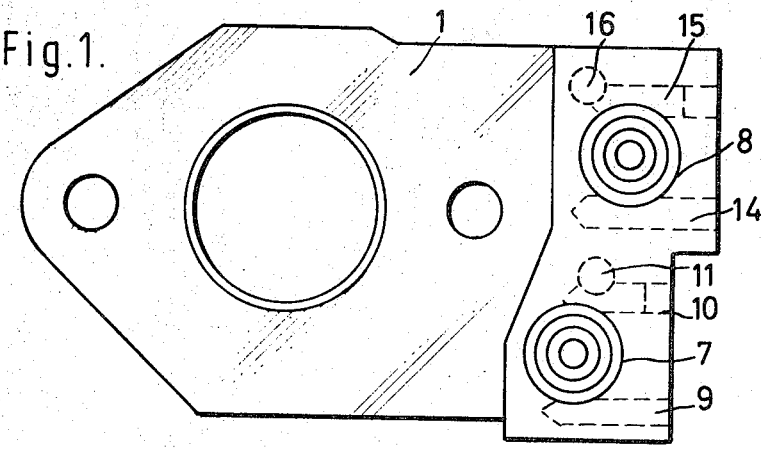
FIG. 1 is a plan view of the upper part of the device.
Figure 2:
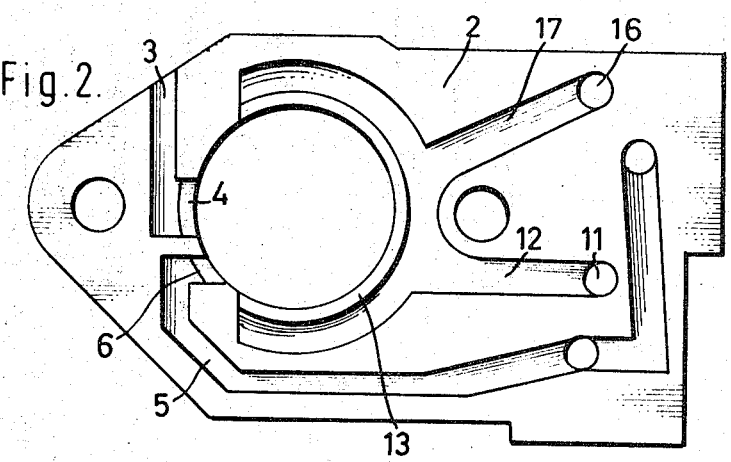
FIG. 2 is a plan view of the lower part of the device.
Figure 3:
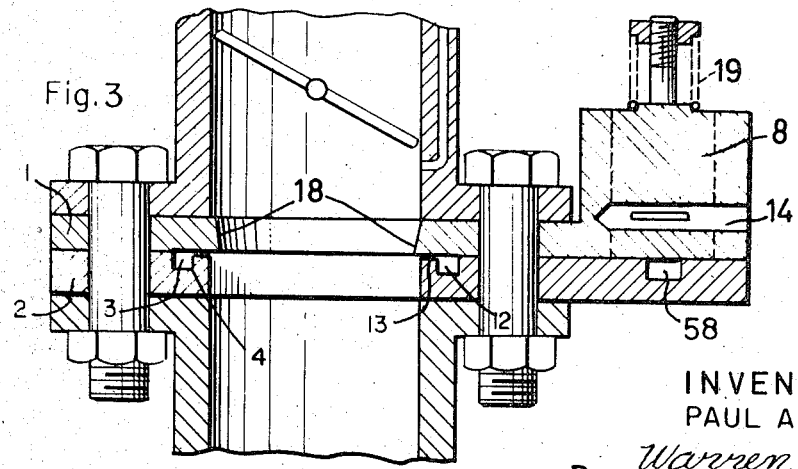
FIG. 3 is a section through the whole device assembled without the switchgear.

FIG. 4 in combination with FIG. 5 is a plan view of the equipment together with a section through the whole assembly incorporating electrical control means interposed in circuit;

FIG. 5 is a circuit diagram for the measuring amplifier;

FIG. 6 shows diagrammatically a possible form for a magnet which presets the actuating shaft of the auxiliary throttle;

FIG. 7 shows the auxiliary throttle without the magnet in FIG. 6, actuated only by a return spring;

FIG. 8 shows in a diagrammatic sketch the action of the magnet and the return spring on the auxiliary throttle and the functional linkage with the carburetor throttle and the engine speed;

FIG. 9 shows diagrammatically the relationship between the auxiliary device which is suitably fitted at the base of the carburetor and the new control means;

FIG. 10 shows diagrammatically the dependence of the force acting on the actuating shaft on the engine speed and the travel of the actuating shaft.

Referring to the drawings, the upper part 1 of the device in accordance with the invention has two air intake devices 7 and 8, each comprising a cylinder and an axially movable piston disposed therein and being constructed as more fully shown in my U.S. Pat. No. 2,928,662 granted Mar. 15, 1960. Passages 11 and 16 pass from parts 10 and 15 of the cylinders into the lower part 2 of the device where they connect to ducts 12 and 17 lead to a port 13 which communicates with the engine induction pipe. On the opposite side of port 13, a port 4 is arranged with an inlet duct 3 leading to an exterior side of section 2 and the atmosphere. Directly alongside is a port 6 with a negative pressure duct 5. These two ports are on the side of the equipment which is under the idling-mixture passages in the carburetor.

The fuel condensate or mixture coming from the carburetor is removed on a tapered component 18 at the lower end and is atomized into a very fine mist by means of a supplementary air feed which enters through the ports 4 and 6, especially during idling, as also in the low speed and load ranges, and made combustible.

During coasting, the piston of intake device 7 is drawn downwards by the rising pressure deficit in the duct 5. By this means, a contact is closed, which supplies current to a magnetic idling jet, when this jet is closed. At the same time, combustion air enters through an inlet duct 9, corresponding ports in the cylinder and the piston of intake device 7 and is passed to an intake duct 10 through the bore 11 and a duct 12 through the port 13, also preparing the condensate in the engine induction pipe.

The second intake device 8 arranged according to the invention provides an inlet cylinder for combustion air during coasting, and is of the same construction as the device 7, for considerations of economy. Obviously, a throttle controlled by negative pressure can alternatively be used for this, or any other suitable means. In this case also, combustion air enters through an inlet duct 14, suitable ports in the cylinder and in the intake device 8, through an inlet duct 15 and through the bore 16, the duct 17 and the port 13 into the induction pipe.

At the same time, the port 13 is arranged preferably on the side of the carburetor opposite the idling side and located at the lower part of the throttle in the closed state. Thus, in this case also, the supplementary air helps to prepare the condensate.

While the piston of intake device 7 is controlled by its spring so that even with a slight pressure rise, during coasting it is drawn downwards already at a speed of about 1,500 r.p.m., and moves upwards again only at about 1,100—1,300 r.p.m., the piston of intake device 8, due to greater pretensioning of its spring 19, is adjusted so that it is drawn downwards only when the pressure difference is greater, i.e. at about 2,000—2,500 r.p.m. and again moves upwards at about 1,600—2,000 r.p.m.

In actual operation, the manner of functioning is approximately as follows: if, at lower speeds of about 50—60 km/h, the mixture is cut off, then only the piston of intake device 7 moves downwards, blocks the fuel feed from the idling jet and allows combustion air to enter the engine induction pipe through the port 13.

If the mixture is cut off at high speeds, e.g. above 60—70 km/h, which corresponds to an engine speed of about 2,000—2,500 r.p.m., then, owing to the increased pressure drop acting through the channel 5 on both pistons, the piston of intake device 8 is also drawn down and thus twice as much supplementary air is admitted through the port 13 into the engine induction pipe. At lower speeds, less fuel flows from the main jet system and the supplementary combustion air from the device 7 is sufficient for this. At higher speeds, more fuel flows out and this is prepared and made combustible by approximately double the volume of supplementary air entering through the two openings.

Since the opening of supplementary air channels with a greater throughput also further reduces the pressure drop when coasting, the provision of two additional air openings is advantageous. It is not possible to obtain the same effect directly with only one device by enlarging the bores and openings and channels. In the exemplary embodiment explained, the said second device closes before the first. By this means, when overrunning with decreasing engine speed, the lesser pressure drop is again increased when the one device opens. Thus the piston of the system remaining open for a longer time can be held longer in its lower position, and thus also, the magnetic idling jet is kept closed longer. This is not possible when coasting if only one device of this kind is provided.

The piston of the first intake device 7 can also be used only for controlling the closing of the magnetic idling jet and the piston of the second intake device 8 only for the air supply, in which case the second piston can advantageously be made larger than the first.

The second intake device for the supply of combustion air when coasting can also, in accordance with the invention, be arranged in another place, e.g. in the case of twin-carburetor engines, on the equalizing channel (not shown) connecting the two engine induction pipes.

The second air intake device 8 can additionally be provided with an arrangement by means of which the piston or the throttle or some other device can also be mechanically opened when the carburetor throttle has reached a certain opening angle.

The opening of the second air intake device on the throttle or the like in this system begins from about 60—80 km/h and above and serves for the additional preparation of fuel condensate forming in the carburetor, after the unilateral action of the idling-mixture device has been lost by entering into the medium or upper speed and load ranges.

Instead of the piston-cylinder arrangement of air intake device 8, an air shutter can also be provided so that in this case also the supplementary air passes through the channel 17 and the port 13, preparing the condensate, into the engine induction pipe.

For this purpose, electronic control means of known type, not shown in the drawing for the sake of simplicity, can be provided, by means of which this air shutter is fully opened also when coasting, it being possible for the pulse for the electronic control means to be released by the piston of intake device 7 which descends during coasting and at the same time also closes a magnetic idling jet of essentially known type, not shown in the drawing. Thus the supplementary air preparing the condensate passes only through a port 13 or through holes lying opposite the carburetor. idling system. This is necessary to prevent unbalanced enrichment of the mixture in the carburetter.

On acceleration, the acceleration pump in the carburtor sprays fuel on this side of the carburetter and enriches the mixture on this side more than on the other.

During coasting, the throttle closes abruptly. Fuel still dribbles by momentum for a few seconds from the main jet system, which closes the idling jet. This dribbling fuel flows substantially through the port between the carburetor wall and the throttle which lies below.

The measuring device for recording the pressure drop, together with the device, for instance, for determining the angular position of the throttle, not shown in the drawing, is similarly not shown in the drawing. By continuous comparison of the pressure drop with the position of the throttle in an electric circuit, the deviation from the normal order of values is determined and this difference is fed to the said electromagnet of the said air shutter, for instance, in the form of a balancing current, so that the motion of the air shutter is either influenced or initiated thereby. In the latter case, the spring 19 is, as a rule, not necessary or serves as a return spring.

The engine speed can also be measured by known means and compared with the pressure drop in the induction pipe to obtain the desired effect of actuating the inlet system.

In the drawing, the measuring amplifier (FIG. 5) is shown in the form of an analogue amplifier but obviously a digital signal processing method could be adopted.

The connections 20, 21 on the measuring recorder feed the measured result to an amplifier 24 by means of the motion of the piston of the air intake devices 7 and 8. This amplifier, which is shown in the drawing as an examplary embodiment, is fed through connections 26. The measuring recoders which measure the variation in the pressure drop can, for instance, be membrane boxes, the travel of which is proportional to the varying pressure drop. The conversion of the pressure drop into an electrical value can be obtained, e.g. by making the oscillations of the membrance box move a potentiometer tap as the pressure drop varies. This potentiometer then feeds to the measuring recorder 20, 21 or to the input of the amplifier 24 a voltage matching the pressure drop. In the exemplary form of embodiment, an air shutter would then be incorporated instead of the piston-cylinder intake device 8. This air shutter, which corresponds to the piston, is moved by electromagnets 30, 31. The air shutter opens less on rapid acceleration i.e. when the pressure drop is less, and more when the pressure drop increases.

At the same time, parallel with the progressively greater opening of the throttle, the air shutter opens increasingly. By means of this air shutter, supplementary air is caused to pass into the engine induction pipe through the channel 17 and the port 13. The air shutter is also fully opened when coasting, the pulse for the electronic control being transmitted for this purpose to the piston of intake device 7, which descends during coasting and thus also closes the magnetic idling jet. The electronic control by means of that piston is represented in the drawing by a recording conductor 34. In both cases, viz, control of the air shutter by the piston and control of the air shutter by the pressure drop, supplementary air for preparing the condensate enters only through the port 13 or through holes which lie opposite the carburetor idling system. This distribution is important to prevent unbalanced enrichment of the mixture in the carburetor.

On acceleration, the accelerator pump in the carburetor injects fuel on this side of the carburetor and thus enriches the mixture more on this side than on the other. When coasting, the throttle is closed abruptly.

The output 23 of the measured-value amplifier 24 is connected to the input of an amplifier 25. This amplifier can be a thyristor. The amplifier 25 is of essentially known design and the connections 27 serve to connect its current supply. The output 28, 29 of this amplifier 25 is connected to the electromagnet 31, 30, in the exemplary form of embodiment, in the form of a pot magnet with a coil 30. The air shutter has a yoke 32 which moves against the return spring 19 in the direction of the arrow 35 and by this means controls the air feed. For this purpose, the port 14 is connected with the atmosphere.

The measured-value amplifier 24 is suitably constructed as a two-stage analogue amplifier with temperature compensation, the temperature compensating system 36 being in the form of a series connection. Temperature compensation is advantageous because great changes in temperature occur when the engine is operating. The circuit shown in the drawing is of essentially known kind. An output resistance RL is the input resistance of the amplifier 25.

It is equally possible and even desirable in accordance with the invention that, to regulate the additional air feed electronically, the speed is measured e.g. by a revolution counter and this measured value is now also fed to the analogue or digital computer, to obtain measured values corresponding to the variations in the speed, and, if necessary, in the throttle position, and which feed supplementary air in these proportions on both sides of the carburetor under optimum conditions so that excessive enrichment of the mixture is prevented in any running condition, i.e. the varying volumes of supplementary air fed to the ports 13, 4 are always dependent on the measured result which is a measure of the fuel supply.

The electronic control can be effected in such a way as is indicated in another exemplary form of embodiment now to be described. From idling up to about 2,000 r.p.m., running load, the condensate is prepared only through the air feeds 3 and 5, on coming from the idling jet system in the carburetor. The "air lead," as it is called, which goes past the control piston is fed through the channel 5.

Only when the running load is about 2,000 r.p.m. is the additional valve opened in such a way that at 3,500—4,000 r.p.m., it is fully open.

It opens less, however, if the main throttle (hereinafter referred to as the HDK), at a suitable speed, opens more than required by the running load, i.e. when climbing a hill, or when accelerating. On the other hand, it opens more if the HDK, at a corresponding speed, is open less than when climbing or coasting.

There follows an example:

| R.p.m.: | Main throttle opening under running load | Auxiliary valve opening under running load |
|---|---|---|
| 2,200 | 10° | 0° |
| 3,000 | 20° | 18° |
| 4,000 | 35° | 45° |
| 5,000 | 53° | 78° |
| 6,000 | 78° | 78° |

From 2,200 r.p.m. running load, the HDK opens 43° up to 5,000 r.p.m. Through the auxiliary valve, this is distributed uniformly over 78° since this valve is still completely shut at 2,200 r.p.m. and should be fully open at 5,000 r.p.m. Since the angle of incidence of the throttle flap is 12°, the full opening corresponds to 78°. If now, on an up-gradient or when accelerating the HDK opens through about 5° or 10°, the auxiliary valve should close by about 5° to 10°. For instance, at 4,000 r.p.m., 45° instead of 35°, thus for the auxiliary valve 35° instead of 45°. . The reverse is equally true. When coasting, e.g. at 3,000 r.p.m., the HDK is open at 20°, so then the auxiliary valve opens from 18° to 38°. At 4,000 r.p.m., the increase rises to 80° or 78° respectively since this is the end position. Thus, there is an enrichment of the mixture on a gradient or when accelerating due to a smaller intake of supplementary air and an impoverishment during hill climbing due to a greater addition of supplementary air. Thus, when coasting, enough supplementary air is fed through this auxiliary valve so that all fuel particles are sure to be burnt without emitting poisonous fumes.

It is thus possible in accordance with the invention so to control the mixture when running under load that always no CO and only a little CH is present. This has already been proved by test results.

A further advantage is to be seen in the fact that when a medium to full load, no vortices form at the breakaway edge, if we pass into this range, since in practice, supplementary air is supplied all-round. It is important, however, that this system should start to function only from a certain speed upwards, shown by experience to be about 2,200 r.p.m., running under load. It is also important that when coasting, the auxiliary valve should again close below 2,200 r.p.m., so that then the pressure drop acts on the control piston and holds it in place up to about 1,400 r.p.m., closing the magnetic idling jet.

A further possible embodiment is shown in FIGS. 6 to 10. The upper part 1 has an inlet channel 14 for the supplementary air. The fuel air mixture flows in the direction of the arrow 57 from the carburetor arranged there, which is not shown in the drawing, through the auxiliary device. The constricted part 18 in the upper element 1 causes a rise in the flow velocity and allows the condensate flowing past the wall 18, which is to be prepared, to escape so that supplementary air flowing in through the ports 4, 13, atomizes and mixes this condensate which has escaped from the constriction 18, and a consistent mixture is thus formed. The ports 4, 13 are provided, in essentially known manner, only at certain points in the constriction 18, and in fact at those points, e.g. where, through the port 13, the idling system with bypass holes is located and, through the port 4, the accelerator jet. Supplementary air is fed to the ports 4 and 13 through the inlet passages 3 or 12 respectively. These passages communicate with a feed channel 58 and the latter in turn with the intake channel 14 into which the supplementary air flows in the direction of the arrow 40. An auxiliary throttle 43 in the inlet channel regulates the supply of supplementary air to the ports 4 or 13.

In accordance with the invention, the throttles 43 influence an actuating shaft 42 by means of a lever 44, and a spring 45, in the form of a return spring which is firmly attached on a lug 47. In FIG. 10 it can be seen that, depending on the travel S, the actuating force P increases linearly along a straight line 55. At the same time, the armature 41 of the electromagnet 46 influences the actuating shaft 42. It is thus immaterial whether a solenoid or a trip-armature or any other suitable form of armature is used. What is essential is that the actuating force has a different dependent relationship on the opening angle of the throttle 43 from that of the spring 45. In the electromagnet used in the exemplary form of embodiment, the actuating force varies along a curve 56 with increasing exitation of the electromagnet. If the two curves 55, 56 are so matched to each other that, for instance, at 2,000 r.p.m. engine speed, the restoring force is exactly as great as the actuating force, then the throttle will open only at speeds above 2,000 r.p.m. It can be seen in FIG. 8 that a DC generator or magneto 50, in the current circuit of which a winding 48 lies, is driven by a belt or shaft 59 from a belt pulley 51 of the combustion engine. The carburetor throttle 52 is shown diagrammatically, from which the air-fuel mixture flows in the direction of the arrow 57. This carburetor throttle 52 is actuated by the rod 53 through the throttle pedal 54. The opening angle of the carburetor throttle 52 is thus dependent only on the travel of the throttle pedal 54.

It can be seen from FIG. 6 that, e.g. with increasing magnetic excitation, the armature 41 is then rotated in the direction of the arrow 60. At the same time, the actuating shaft 42 also moves.

Instead of the spring 45 and the electromagnets 41, 42, 46, 48, obviously equivalent means are also possible. It is also unnecessary for the curve 56 to be a parabola. The only essential feature is that the auxiliary throttle 43 is moved with a certain lag after actuation of the carburetor throttle 52, dependent on the pressure drop and the engine speed. Together with the arrangement of the ports 4, 13, in the region in which the condensate is deposited, by means of the new invention it is now possible to ensure both when idling and when coasting, as well as on acceleration, that practically no unburnt gases are allowed to remain, i.e., the CO-content is reduced to a minimum.

I claim:

1. In an internal combustion engine having an air-fuel intake conduit and a carburetor having a butterfly throttle valve and an air-fuel mixture discharge throat connected to said conduit, said throttle valve having a closed position lying diagonally across the discharge throat with a lowermost edge portion of said valve at one side of said throat, wherein the pressure in said conduit varies over a reduced pressure range during the operation of the engine, the improvement comprising:

means providing an inlet duct connected to the atmosphere and to said conduit by an orifice for admitting supplemental air thereto, second means providing first and second passages each opening at an exterior end to the atmosphere and having interior ports opening to said conduit in substantially diametrically opposed relation to said orifice for admitting supplemental air thereto, said orifice being disposed opposite to said edge and said ports being substantially aligned with said edge, normally closed first and second valves mounted in said passages for controlling the air flow therethrough, a first pressure-responsive actuator for said first valve connected to said conduit and being responsive to a predetermined magnitude of reduced pressure therein within said range for opening said first valve, and a second pressure-responsive actuator for said second valve connected to said conduit and being responsive to a second predetermined magnitude of reduced pressure within said range for opening said second valve in successive relation to said first valve upon a predetermined change of pressure within said range and to close said second valve before said first valve upon a predetermined increase of pressure thereafter.

2. The improvement defined in claim 1 wherein said first and second means comprise a housing having a bore therethrough and being adapted for fastening to said carburetor and conduit with said bore in flow registration with said throat and conduit, said first and second passage being formed in said housing and terminating in a port in said bore, and said first and second valves being carried by said housing in flow interrupting relation across said passages.

3. The improvement defined in claim 1, said housing being formed with an internal shoulder in said bore on the upstream side of and adjacent to said port.

4. The improvement defined in claim 3, wherein said shoulder is of annular form having an inner wall convergently tapered in a downstream direction.

UNITED STATES PATENT OFFICE
CERTIFICATE OF CORRECTION

Patent No. 3,561,409  Dated February 9, 1971

Inventor(s) Paul August

It is certified that error appears in the above-identified patent and that said Letters Patent are hereby corrected as shown below:

In the ABSTRACT, line 3, change "conduct" to --conduit--.

In the ABSTRACT, line 6, change "conduct" to --conduit--.

Column 3, line 53, change "parts" to --ports--.

Column 3, line 55, after "lead to a", insert --common--.

Column 5, line 25, change "carburtor" to --carburetter--.

Signed and sealed this 13th day of July 1971.

(SEAL)
Attest:

EDWARD M. FLETCHER, JR.
Attesting Officer

WILLIAM E. SCHUYLER, JR.
Commissioner of Patents